United States Patent
Ozdemir et al.

(10) Patent No.: US 6,915,354 B1
(45) Date of Patent: Jul. 5, 2005

(54) DISTRIBUTED ISCSI AND SCSI TARGETS

(75) Inventors: Kadir Ozdemir, San Jose, CA (US); Ismail Dalgic, Sunnyvale, CA (US); Michael Syben, Scotts Valley, CA (US); Frederic Pont, Mountain View, CA (US); Jeffrey Henry Raubitschek, Fremont, CA (US); Omer Tunali, Sunnyvale, CA (US)

(73) Assignee: Intransa, Inc., San Jose, CA (US)

( * ) Notice: Subject to any disclaimer, the term of this patent is extended or adjusted under 35 U.S.C. 154(b) by 239 days.

(21) Appl. No.: 10/136,221

(22) Filed: Apr. 30, 2002

(Under 37 CFR 1.47)

(51) Int. Cl.[7] .............................................. G06F 13/00
(52) U.S. Cl. ................................ 710/5; 70/54; 70/310; 70/20
(58) Field of Search .......................... 710/5–10, 20–21, 710/36–41, 52–56, 310–313; 711/118; 712/29; 718/100; 725/88; 370/401

(56) References Cited

U.S. PATENT DOCUMENTS

| | | | | |
|---|---|---|---|---|
| 5,421,014 A | * | 5/1995 | Bucher | 718/100 |
| 5,644,789 A | * | 7/1997 | Matthews et al. | 710/36 |
| 5,687,390 A | * | 11/1997 | McMillan, Jr. | 710/5 |
| 5,721,880 A | * | 2/1998 | McNeill et al. | 703/25 |
| 5,928,327 A | * | 7/1999 | Wang et al. | 725/88 |
| 5,987,558 A | * | 11/1999 | Monia et al. | 710/240 |
| 6,112,278 A | * | 8/2000 | Ellis et al. | 711/118 |
| 6,122,723 A | * | 9/2000 | Day et al. | 712/29 |
| 6,205,494 B1 | * | 3/2001 | Williams | 710/5 |
| 6,671,782 B1 | | 12/2003 | Menon | |
| 6,683,883 B1 | * | 1/2004 | Czeiger et al. | 370/401 |
| 2003/0084209 A1 | * | 5/2003 | Chadalapaka | 710/5 |
| 2004/0139145 A1 | | 7/2004 | Bar-Or et al. | |

\* cited by examiner

*Primary Examiner*—Christopher B. Shin
(74) *Attorney, Agent, or Firm*—Dorsey & Whitney LLP (57) ABSTRACT

Apparatus and methods for distributing iSCSI and SCSI targets. The initiator may assist in the distribution and order the SCSI commands. A subset of target storage processors may act as proxies. Target storage processors forward requests to a selected target storage processor which decides whether any and which of the other target storage processors is to process a forwarded request. The target storage processors may act as peers. A target storage processor communicates each received request to all of the other storage processors. Each of the target storage processors determines whether a request it received is to execute. A target storage processors may arrange themselves into layers to divide the SCSI and iSCSI protocol work. A distributed system associates each of multiple egress target storage processors with a respective ingress target storage processor and associates a set of blocks of storage with each of the egress target storage processors.

35 Claims, 9 Drawing Sheets

DISTRIBUTED ISCSI AND SCSI TARGETS

This invention relates to communicating with I/O devices and to distributed computer systems. More particularly, this invention relates to communicating with SCSI and iSCSI target storage devices and distributing portions of the SCSI and iSCSI client-server models.

BACKGROUND OF THE INVENTION

The SCSI and TCP protocols are well known within the art of computer science. In brief, SCSI is a standard specifying the interface between devices that were originally controllers and peripherals in computer systems. The SCSI architecture is a client-server architecture wherein clients and servers are called "initiators" and "targets," respectively. Initiators send service requests to targets and receive responses from targets.

A target is a collection of logical units. Each logical unit contains a device server, one or more task sets (queues) and a task manager.

SCSI recognizes two types of requests: device-server requests and task-management requests. The device server processes the device-server commands while the task manager is responsible for task management.

A device-server request is a SCSI command for execution on a logical unit, such as a block read/write command. Each device-server request defines a unit of work for a logical unit. Within a logical unit, a task represents a unit of work.

A SCSI task is an execution context a target creates for a SCSI command or a series of linked SCSI commands. A new task is created for each single command, while the same task is used for all the commands in a series of linked commands, also referred to as a "chain of commands." A task persists until a command (or a series of linked commands) completion response is sent or until the task is ended by a task management function or exception condition. The initiator sends the next linked command in a series of linked commands only after the current command completes. That is, only one pending command exists per task. From the initiator's point of view, the device server is not multi-tasking; a task executes until it completes. This property allows initiators to implement, for example, read-modify-write commands using linked commands.

Task management requests control the execution of tasks. Examples of task management requests include aborting a task, clearing an exception condition and resetting a logical unit. The task manager manages task queues and serves task management requests.

A task may be in one of four states: dormant, enabled, blocked, and ended. A task is added to the task queue as enabled or dormant and is removed from the queue when it is in the ended state. A task executes (i.e., becomes a current task) only if its state is enabled. A task state changes from enabled to ended if it successfully completes or if a task management request aborts it. A task is terminated if an exception is encountered during its execution. When an exception happens in a task queue, a Contingent Allegiance (CA) or Auto Contingent Allegiance (ACA) condition is established for the task queue based on its configuration. The iSCSI protocol mandates ACA.

The difference between ACA and CA is in the steps of clearing them. Initiators clear an ACA condition by sending CLEAR ACA task management requests.

When an ACA condition is established all the enabled tasks in the task queue change into the blocked state. Only the tasks with the ACA attribute are allowed into the queue until the ACA condition is cleared. The blocked tasks move back to the enabled state after the ACA condition is cleared. A dormant task becomes either enabled or ended (because the initiator aborts it). An initiator may abort any task by sending a task management request.

Initiators associate each task with a task attribute by including the attribute in their request. Acceptance of a new task to a queue in the dormant or enabled state is based on its attribute and the attributes of the current tasks in the queue.

There are four task attributes, simple, ordered, head of queue and ACA. A task having the simple attribute is accepted into the task queue in the dormant state. The task does not enter the enabled state until all older head-of-queue and all older ordered tasks in the queue have ended.

A task having the ordered attribute is accepted into the queue in the dormant state. The task does not enter the enabled state until all older tasks in the queue have ended.

A task having the head-of-queue attribute is accepted into the queue in the enabled state. A task having the ACA attribute is accepted into the queue in the enabled state. No more than one ACA task exists per task queue at any time.

The above description for task queue management allows simple tasks to execute in any order in a task queue. However, a task queue may be configured with either restricted or unrestricted reordering of simple tasks. In the restricted ordering, the order of reads and writes to the same block must be preserved for simple tasks. This ensures data integrity from the initiator's point of view. The unrestricted reordering configuration does not impose any rule on simple task reordering. A target may maintain one task queue per logical unit or one task queue per logical unit per initiator.

Both initiators and targets have ports to communicate with their counterparts. The requests and responses are sent through and received from these ports. An initiator or target has one or more ports. Each port has a unique identifier.

Each request includes its initiator and target port identifiers. These identifiers are in a "nexus object" in the request. In addition, the nexus object optionally contains an identifier for the logical unit and the task. The logical unit identifier is included if the request is destined for a particular logical unit. Similarly, the task identifier is included if the request is for a specified task. If the nexus object of a request does not include a task identifier then the corresponding task created in the target is an "untagged task." It is assumed that an untagged task has a simple task attribute. Only one untagged task may be in a task queue. The nexus object of a SCSI command request includes the logical identifier as a SCSI command request is destined to a particular logical unit.

SCSI is described more fully in the SCSI-3 Architecture Model (SAM), available at www.ansi.org as ANSI X3.270-1996, in the SCSI Architecture Model-2 (SAM-2), available at ftp://ftp.t10.org/t10/drafts/sam2/sam2r22.pdf, and in the references mentioned therein. However, revision 22 of SAM-2, dated Jan. 22, 2002, is not prior art.

The iSCSI protocol maps the SCSI remote procedure invocation model over the TCP protocol. iSCSI requests carry SCSI commands, and iSCSI responses carry SCSI responses and status. iSCSI also uses the request-response mechanism for iSCSI protocol mechanisms.

iSCSI is described more fully in iSCSI, available at http://search.ietf.org/internet-drafts/draft-ietf-ips-iscsi-11.txt, and in the references mentioned therein. However, iSCSI, dated Mar. 1, 2002, is not prior art.

Distributing a SCSI target leads to distributed task queue management over storage processors, computing platforms with networking capabilities for housing the iSCSI target, SCSI target, or block-storage functions. Distribution implies that multiple storage processors may receive SCSI requests for the same logical unit at the same time. Simultaneous per-LU requests will interleave the execution of SCSI requests if these processors do not exchange information about the states of their task queues. SCSI requests, however, cannot be interleaved arbitrarily.

Accordingly there is a need for a distributed SCSI solution wherein request execution does not violate the SCSI task queue management rules.

The iSCSI layer in a target orderly delivers SCSI requests to the SCSI layer. The iSCSI initiator assigns a monotonically increasing session-wide sequence number for each iSCSI request except for immediate requests. The session-wide sequence numbering defines the order. When the iSCSI layer is distributed over storage processors, the individual iSCSI layer in the storage processors receives only a subset of the iSCSI request, creating gaps in the iSCSI queue. This gap prevents delivery of non-immediate requests to the SCSI layer.

Thus, there is a need for a protocol to fill gaps in a distributed iSCSI environment and to enable the processing of requests.

The iSCSI PDU transmitted from the initiator to target carries a maximum command sequence number (MaxCmdSN) and an expected command sequence number (ExpCmdSN). The initiator uses the ExpCmdSN and MaxCmdSN from a target to determine the receiving window of the target. The iSCSI target does not transmit the MaxCmdSN less than the ExpCmdSN. Also, the target must silently ignore any non-immediate request outside of this range or non-immediate duplicates within the range. When the iSCSI layer is distributed over storage processors, the individual iSCSI layer in the storage processors receives only a subset of the iSCSI requests, leaving the individual target unable to correctly determine the current receiving window size and to communicate it to the initiator.

Accordingly, there is a need for a protocol to determine the receiving window size and correctly handle requests inside and outside this range.

These and other goals of the invention will be readily apparent to one of skill in the art on reading the background above and the description below.

SUMMARY

Herein are taught apparatus and methods for distributing iSCSI and SCSI targets. The initiator may assist in the distribution. For example, a distributed system may establish a session between an initiator and target storage processors. The initiator may maintain information about the state of the session and may track iSCSI requests and SCSI commands and responses between the initiator and storage processors using the information about the state of the session. The initiator may then order the SCSI commands. To assist this process, the initiator may maintain a queue per logical unit for SCSI commands waiting to be communicated to the logical unit, a queue per logical unit per connection for SCSI commands for execution on the logical unit and to be communicated over the connection, or a queue per connection for iSCSI requests to be communicated over the connection.

A subset of target storage processors may act as proxies. For example, a distributed system may establish a session between an initiator and target storage processors and select one of the target storage processors to oversee request order and task queue management. The other target storage processors forward requests to the selected target storage processor. The selected target storage processor decides whether any and which of the other target storage processors is to process a forwarded request. Block data resulting from the request, however, is forwarded to the initiator and not to the selected target storage processor.

The target storage processors may act as peers. For example, a distributed system may establish a session between an initiator and target storage processors. The target storage processors communicate each request received on one of the target storage processors to all of the other storage processors and communicate each response from a storage processor to each storage processor that has received a request dependent on the response. This communication may be accomplished by multicast or unicasting. Each of the target storage processors maintains a copy of SCSI target queue and updates its copy based on the communicated requests. Each of target storage processors determines whether a request it received is to execute. A target storage processor announces a received ordered command to the other target storage processors and waits for confirmations of the announcement from the other target storage processors.

A target storage processors may arrange themselves into layers to divide the SCSI and iSCSI protocol work. For example, a distributed system may establish a session between an initiator and ingress target storage processors, associate each of multiple egress target storage processors (of the distributed target) with at least one of the ingress target storage processors and associate a respective set of blocks of storage with each of the egress target storage processors. The distributed system implements the iSCSI or SCSI protocol in ingress target storage processors. The ingress target storage processors may be considered a layer. Likewise, the egress target storage processors may be considered a layer. The ingress target storage processors process SCSI requests, thereby determining which of the egress target storage processor are destinations for the requests. The ingress target storage processors then dispatch the SCSI requests to the determined egress target storage processors.

The ingress target storage processors may be considered a layer. Likewise, the egress target storage processors may be considered a layer. The layer of ingress target storage processors may process iSCSI and SCSI PDUs and SCSI task management, while the layer of egress target storage processors may re-order simple commands or implement SCSI device server functionality.

The layer of ingress target storage processors may combine iSCSI and SCSI queue state and represent the combined iSCSI and SCSI queue state in a single data structure such as a bit array, each bit representing an iSCSI request state. The layer of ingress target storage processors may exchange the combined queue state.

DESCRIPTION OF THE INVENTION

Glossary

ACA: Auto Contingent Allegiance.
CA: Contingent Allegiance.
CmdSN: Command Sequence Number.
ExpCmdSN: The next Expected Command Sequence Number.
ID: Identifier.
iSCSI: SCSI over TCP.
LAN: Local Area Network.
LU: Logical Unit.
LUN: Logical Unit Number.
MaxCmdSN: The Maximum Command Sequence Number.
PDU: Protocol Data Unit.
RAID: Redundant Array of Independent Disks.
SN: Sequence Number.
SCSI: Small Computer System Interface.
TCP: Transmission Control Protocol.
WAN: Wide Area Network.

Overview

Figure 1:
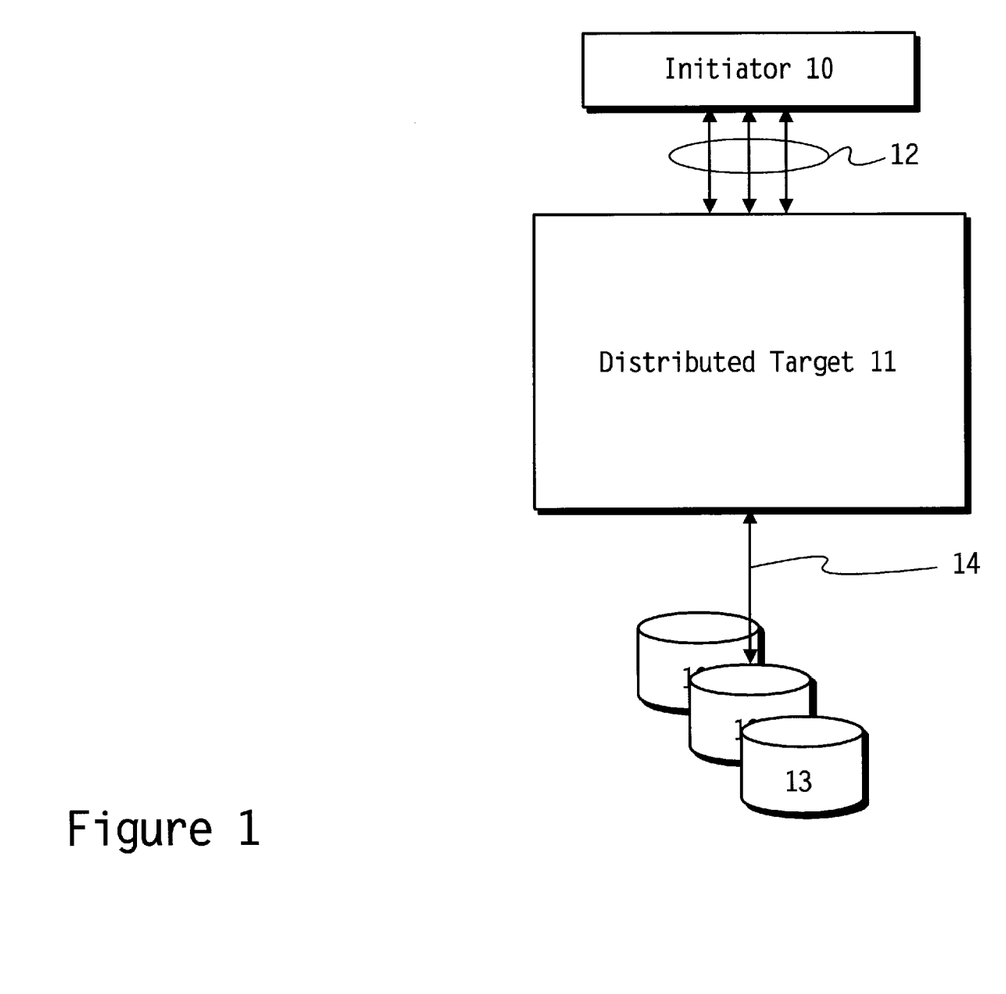
FIG. 1 illustrates a system incorporating an embodiment of the invention.

FIG. 1 illustrates a system 1 incorporating an embodiment of the invention. The system 1 may include an initiator 10, a distributed target 11, one or more storage devices 13 and communications links 12, 14. The links 12 communicatively couple the initiator 10 and the distributed target 11 while the link 14 communicatively couples the distributed target 11 and the storage devices 13.

The initiator 10 may be a SCSI or iSCSI initiator. The distributed target 11 is then a corresponding SCSI or iSCSI target.

The communications links 12 may be multiple physical links supporting multiple connections or may be a single physical link again supporting multiple connections. The multiple connections compose a single session.

Data Structures

The first data structure is a variable indicating whether there is an outstanding linked command for a given logical unit. That variable is herein termed, the "Linked Flag."

A second data structure is a waiting SCSI command queue.

Another data structure is an outstanding SCSI command queue.

Another data structure is an iSCSI request queue.

Another data structure is a variable counting the number of outstanding ordered commands for a given logical unit. That variable is herein termed, the "Outstanding Ordered Command Counter."

Yet another data structure is a variable for counting the number of outstanding head-of-queue commands for the logical unit. That variable is herein termed, the "Outstanding Head-of-queue Command Counter."

Another data structure is a variable for counting the number of outstanding commands for the logical unit. That variable is herein termed, "Outstanding Command Counter."

Another data structure is an inter-target message. Targets storage processors may exchange inter-target messages to synchronize their states of information.

Another data structure is a buffer for tracking iSCSI requests. That buffer is herein termed, the "request buffer."

A queue table tracks the state of one or more task queues.

Additional data structures are defined by the SCSI and iSCSI protocols. These data structures are not defined here.

Protocols

Initiator Assist

Figure 2:
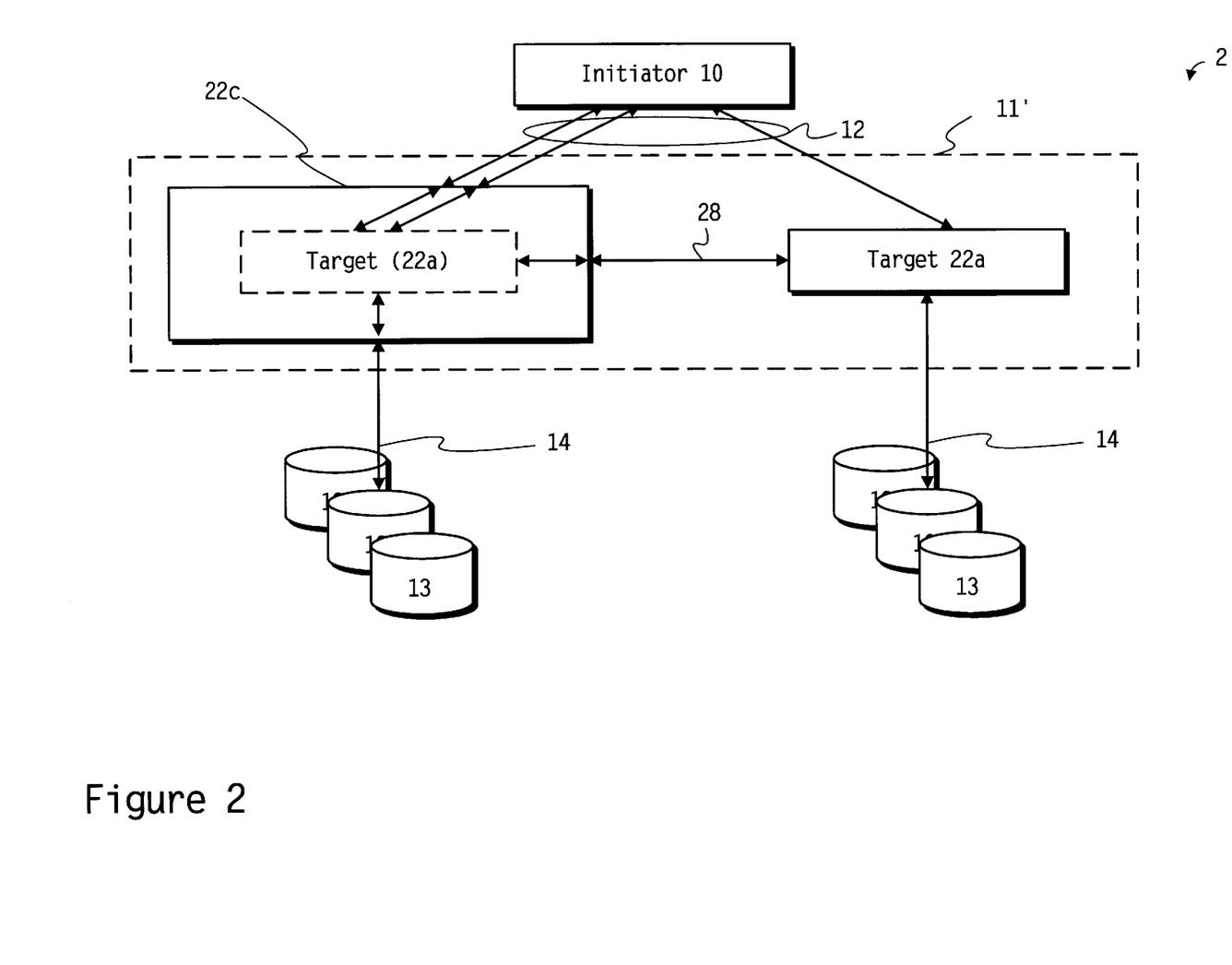
FIG. 2 illustrates the architecture of a computer system incorporating another embodiment of the invention.

FIG. 2 illustrates the architecture of a computer system 2 incorporating another embodiment of the invention. FIG. 2 includes an initiator 10, a distributed target 11', one or more storage devices 13 and communications links 12, 14. The links 12 communicatively couple the initiator 10 to the distributed target 22, and the link 14 communicatively couples the distributed target 11' to the storage devices 13.

The initiator 10 may be a SCSI or iSCSI initiator. The distributed target 11' is then a corresponding SCSI or iSCSI target.

The communications links 12 may be multiple physical links supporting multiple connections or may be a single physical link again supporting multiple connections. The multiple connections compose a single session.

The distributed target 11' may include two or more storage processors 22 and a communications link 28. The link 28 communicatively couples the storage processors 22 to each other 22. The link 28 may be a separate physical link or may be a part of one or more networks such as a LAN or WAN.

The initiator 10 may establish an iSCSI session with multiple storage processors 22, using one or more TCP connections per storage processor 22. The initiator 10 keeps one waiting SCSI command queue per logical unit, one outstanding SCSI command queue per logical unit and TCP connection pair, and one iSCSI request queue per TCP connection. For each logical unit, the initiator 10 maintains the following variables: a Linked Flag, an Outstanding Ordered Command Counter, Outstanding Head-of-queue Command Counter and an Outstanding Command Counter.

An initiator 10 may receive a SCSI command from an application and place the command on a waiting SCSI command queue based on the logical unit number to which the command is destined. The initiator 10 adds the command at the tail of the waiting SCSI command queue to one of the outstanding SCSI command queues when no outstanding linked command exists for the logical unit, the outstanding command counter is equal to the outstanding ordered command counter if the command is ordered, and the outstanding ordered command and head-of-queue command counters are zero if the command simple.

Before submitting a new read or write command for a block range, the initiator 10 may check the outstanding command queues to determine whether an outstanding command exists whose block range overlaps that of the new command. If so, the initiator 10 sends the new command over the TCP connection corresponding to the queue containing the overlapping command.

When an ordered command is outstanding, the initiator 10 places the new ordered command on the queue that includes an outstanding ordered command. Thus, the initiator sends multiple ordered commands over the same TCP connection while preserving their order.

The target or system management (an administrator or agent software) may communicate a per-connection buffer size. The initiator 10 does not exceed this fixed size—that is, the buffer size limits the maximum depth of the outstanding iSCSI queue.

Some of the SCSI task-management functions may be applicable to a logical unit, target or a set of tasks. SCSI commands may configure a logical unit or a target. A subset or all of the storage processors of a distributed target may need to process the iSCSI requests for these SCSI commands. The initiator or the storage processors may effect the distribution and coordination of such iSCSI requests. The initiator may replicate such requests to the corresponding storage processors. Alternatively, a storage processor may disseminate such requests to the other storage processors of the distributed target.

Initiator assistance pushes the complexity of distributing a target into initiators rather than the storage processors. Such a centralized solution may be easier to design and implement than one distributed over multiple storage processors.

Proxy Target

Figure 3:
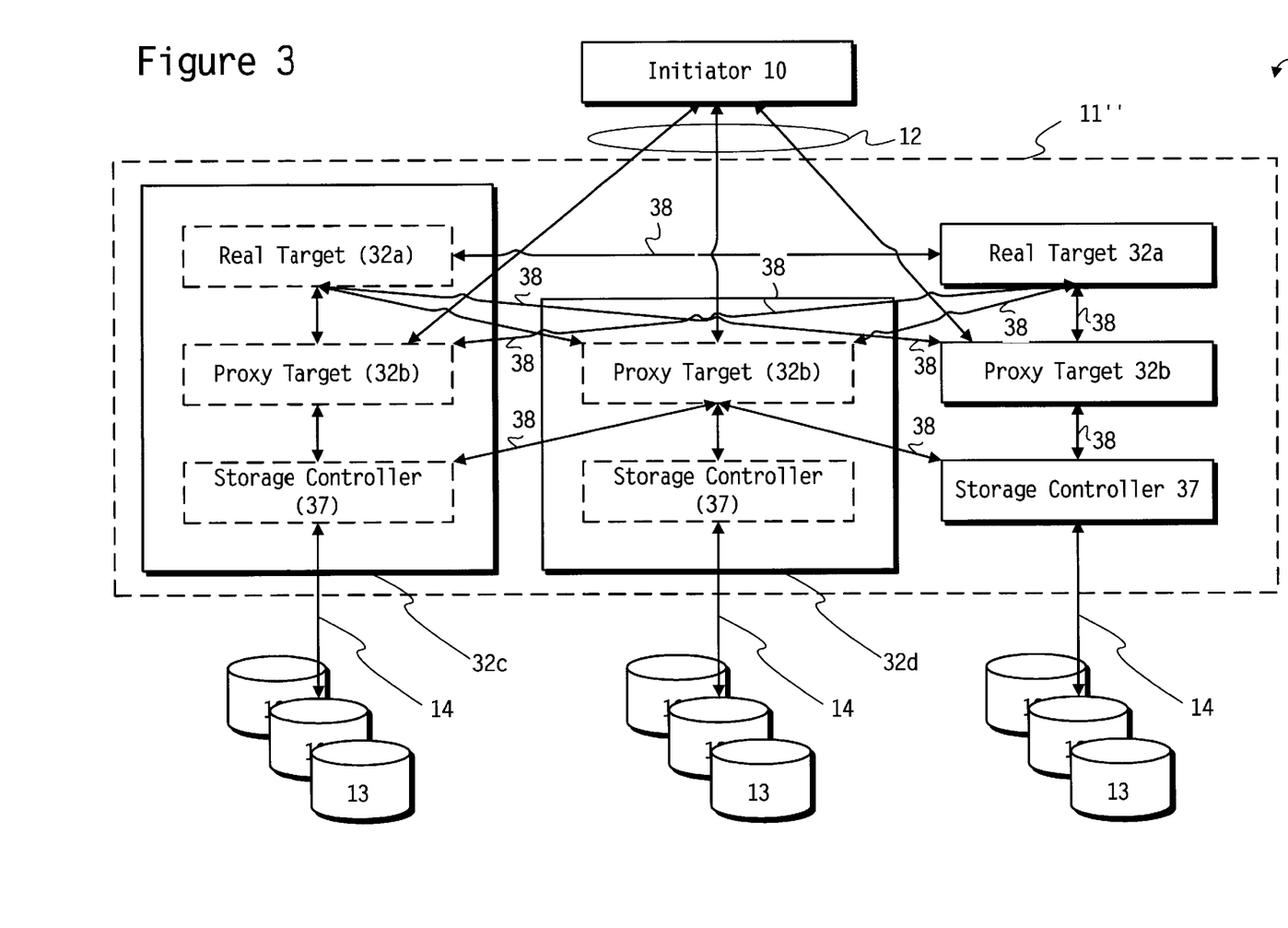
FIG. 3 illustrates the architecture of a computer system incorporating another embodiment of the invention.

FIG. 3 illustrates the architecture of a computer system 3 incorporating another embodiment of the invention. FIG. 3 includes an initiator 10, a distributed target 11", one or more storage devices 13 and communications links 12, 14. The links 12 communicatively couple the initiator 10 to the distributed target 11", and the link 14 communicatively couples the distributed target 11" to the storage devices 13.

The distributed target 11" may include two or more storage processors 32 and communications links 38. The links 38 communicatively couple the storage processors 32 to each other. The links 38 may be separate physical links or may be part of one or more networks such as a LAN or WAN.

System management may select a storage processor 32a (or an equivalent (32a) in a processor 32c) to be responsible for overseeing iSCSI request ordering and SCSI task queue management for an iSCSI session. The selected storage processor 32a, (32a) takes on the responsibility on behalf of all the other storage processors 32 involved in this session. This selected storage processor 32a, (32a) is termed herein, the "real target" for the session. The other storage processors 32b (and their equivalent (32b) in storage processors 32c, 32d) are herein termed, "proxy targets." A storage processor 32 may be both a real and a proxy target.

When a proxy target 32b, (32b) receives an iSCSI request, it may forward the request to the real target 32a to inform it of the received request. The real target 32a adds this request to its queue. If a request in the queue is enabled, the real target 32a sends a message to the corresponding proxy target 32b, (32b) to process the request. When that proxy target 32b, (32b) completes this request, it sends a response to both the initiator 10 and the real target 32a to communicate the completion of the request. The real target 32a deletes the request from the queue.

The proxy target 32b, (32b) may not forward any block data that may be associated with the request. If the request returns block data, the proxy target may send the data to the initiator 10 and not to the real target 32.

Figure 6:
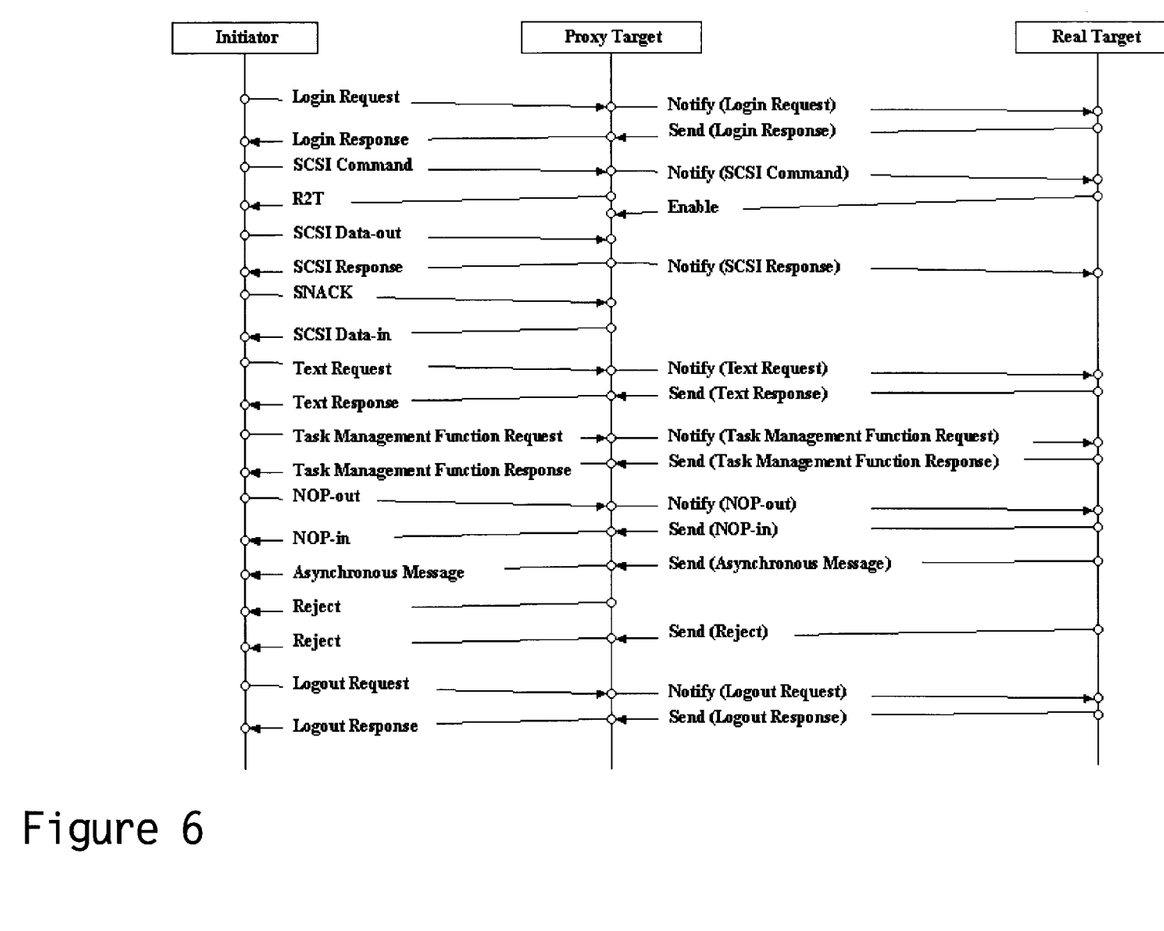
FIG. 6 illustrates iSCSI PDU exchange between a proxy target and a real target according to one embodiment.

Inter-target messages that a proxy target 32b, (32b) and a real target 32a may exchange are described below. FIG. 6 illustrates their use, according to one embodiment:

A Notify message notifies the real target 32a of a new iSCSI PDU. Such PDUs may include login requests, SCSI commands, SCSI responses, text request, task-management requests, NOP-out and logout requests. A Notify message includes the PDU, except for SCSI command and SCSI response PDUs. For these, the notify message includes only the PDU header. The Notify message also includes the distributed target ID, the session ID and connection ID to identify the connection over which the iSCSI PDU has been received.

With a Send message, the real target 32a sends an iSCSI PDU to the initiator 10 via the proxy target 32. Such PDUs may include login responses, text responses, task-management responses, text requests, asynchronous messages, rejects and logout responses. The Send message also includes the distributed target ID, the session ID and the connection ID to identify the connection over which the iSCSI PDU is to be sent. The proxy target 32b, (32b) supplies the connection-specific fields of the iSCSI PDU (for example, the sequence numbers).

With an Enable message, a real target 32a instructs a proxy target 32b, (32b) to enable a SCSI command for processing. The Enable message includes the distributed target ID, the session ID, the command sequence number (CmdSN) of the command to be enabled, the expected command sequence number (ExpCmdSN) from the initiator 10 and the maximum command sequence number (MaxCmdSN) that may be received from the initiator 10.

With an Abort Task message, a real target 10a aborts a task. An Abort Task message includes the distributed target ID, the session ID, the command sequence number (CmdSN) of the command to be aborted, the expected command sequence number (ExpCmdSN) from the initiator 10 and the maximum command sequence number (MaxCmdSN) that may be received from the initiator 10.

The Abort Task Set message has the same content as the Abort Task message. However, the proxy target 32 is to abort all the outstanding commands up to the specified command sequence number.

With the Establish ACA message, the real target 32a announces to the proxy targets 32 that the ACA condition is established for a particular task queue. The message includes the distributed target ID, the session ID and logical unit number. It also includes ExpCmdSN and MaxCmdSN.

With the Clear ACA message, the real target 32a announces to the proxy targets 32 that the ACA condition is cleared for a particular task queue. This message includes the distributed target ID, the session ID and the logical unit number. It also includes ExpCmdSN and MaxCmdSN.

Using a Reset LU, the real target 32a resets the logical units. The Reset LU message includes the distributed target ID and the logical unit number, as well as ExpCmdSN and MaxCmdSN.

With a Reset Target message, a real target 32a resets targets. The Reset Target message includes the distributed target ID, as well as the ExpCmdSN and MaxCmdSN.

A Drop Connection messages directs a proxy target 32 to drop a particular connection. The message includes the distributed target ID, the session ID and the connection ID, as well as the ExpCmdSN and MaxCmdSN.

Similarly, a Drop Session message directs a proxy target 32 to drop a particular session. The message includes the distributed target ID and the session ID.

An Event message communicates to a real target 32a the occurrence of an event or an exception. A proxy target 32b, (32b) may send an event message if a connection is dropped, a target is reset, a logical unit is reset, or a request from the real target cannot be served. The message includes the target ID, the session ID, the connection ID, the reason code and other event specific parameters.

A proxy target transfers iSCSI PDUs over TCP. The real target implements the iSCSI session and connection management, and the SCSI task queue management. ExpCmdSN and MaxCmdSN are session-wide counters and are in iSCSI PDUs from the target to the initiator 10. These counters define the available buffer size in the distributed target. The real target 32a conveys the current value of these counters to the proxy targets 32 in every occasion so that the initiator 10 effectively utilizes the available buffers in the target.

Two real targets 32a for each distributed target increase the reliability of a system 3. The proxy targets 32b, (32b) then send their message to both real targets 32a. Only one real target 32a is active at a time, and the active real target 32a interacts with the proxy targets 32b, (32b). The active real target 32a replicates each message sent to a proxy target 32b, (32b) to the inactive real target 32a. The inactive real target 32a builds the state of the active target by passively listening to the interaction between the active real target 32a and its proxy targets 32. Using well-known failure detection and takeover procedures, the inactive real target 32a may take over the responsibilities of the active real target 32a in case the active target 32a fails.

One-Layer Target

Figure 4:
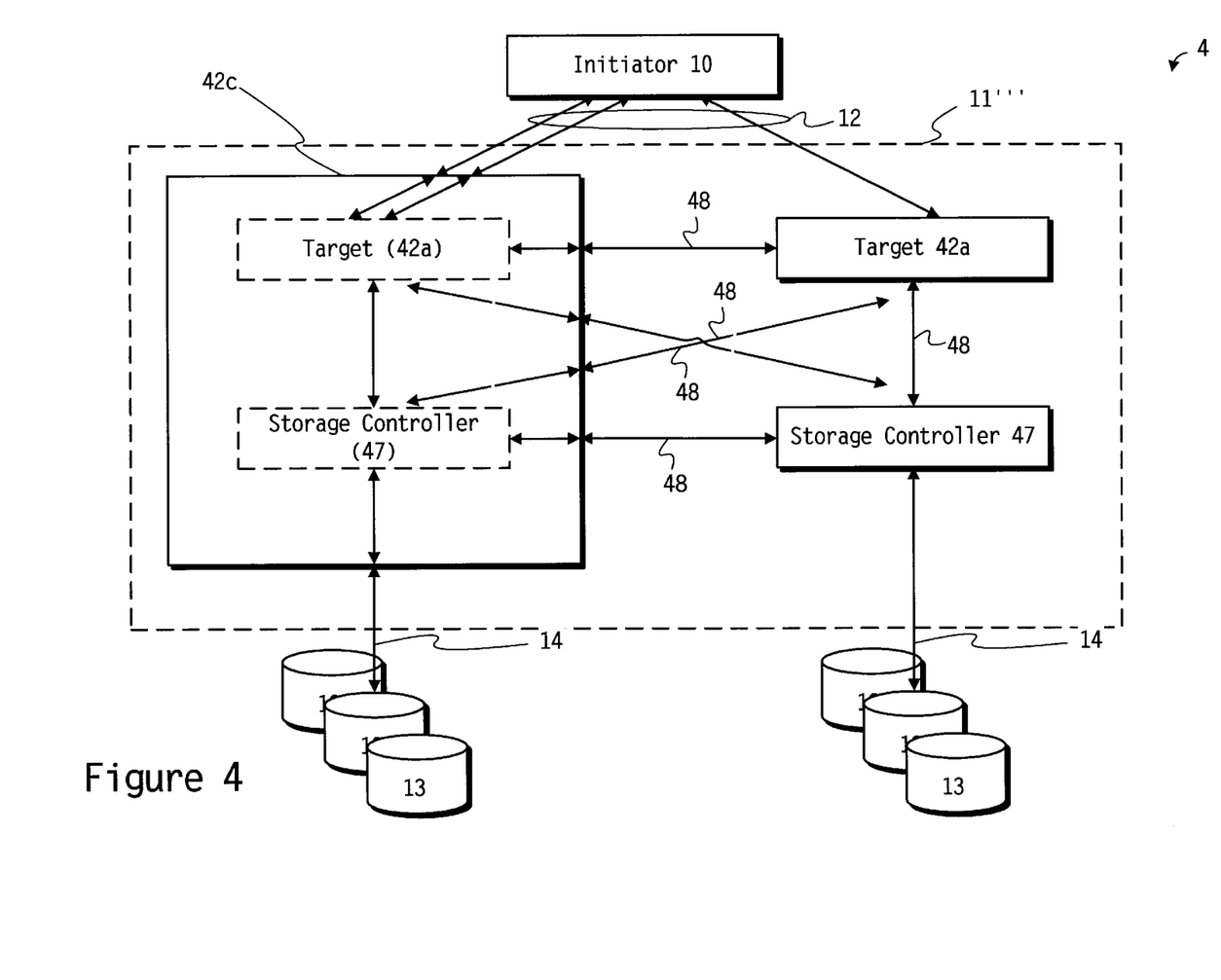
FIG. 4 illustrates the architecture of a computer system incorporating another embodiment of the invention.

FIG. 4 illustrates the architecture of a computer system 4 incorporating another embodiment of the invention. FIG. 4 includes an initiator 10, a distributed target 11''', one or more storage devices 13 and communications links 12, 14. The links 12 communicatively couple the initiator 10 to the distributed target 11''', and the link 14 communicatively couples the distributed target 11''' to the storage devices 13.

The distributed target 11''' may include two or more storage processors 42 and communications links 48. The links 48 communicatively couple the storage processors 42 to each other. The links 48 may be separate physical links or may be part of one or more networks such as a LAN or WAN.

Each storage processor 42 shares each received iSCSI request of a session with every other storage processor 42. The communication method may be a multicast or a number of unicast messages, although inefficiencies follow the latter method.

Each storage processor 42 maintains a replica of the iSCSI and SCSI target queues. The (multicast) messages communicate the changes in the state of the queues. For each iSCSI PDU received and sent, a storage processor 42 sends a message containing the iSCSI PDU to the other storage processors 42.

Some exceptions may exist. For example, the storage processors 42 do not need to know the data payload for SCSI read and write operations in order to form a global state of iSCSI and SCSI queues. The messages include only the headers of SCSI Command and SCSI Response PDUs used to carry out SCSI read and write operations. The Data-in and Data-out PDUs are not replicated for these operations.

A storage processor cannot enable a simple command without making sure that no prior command is outstanding with the ordered or head-of-queue task attribute or with the simple command attribute with a block range that overlaps the current command's block range. Thus, each storage processor 42 shares information about each received iSCSI request with the other storage processors 42 in the group.

Data integrity imposes ordering among simple commands if their block ranges overlap. Assume that the storage processors 42 receives first and second simple commands. Assume also that the sequence number of the first command is prior to that of the sequence number for the second command and that the commands' block ranges overlap. Also, assume that the first command is a write and the second command is a read. Data integrity requires that the first command execute before the second. Therefore, a storage processor 42 cannot start the second command without knowing that the first command has completed. Thus, the processor 42 serving the first command sends a message to all the other processors 42 indicating the completion of the first command. Unicast messages for completions may achieve this goal. This message may be a copy of the iSCSI response PDU header.

If a storage processor 42 receives a simple command and knows that no older command is outstanding with the ordered or head-of-queue task attribute, it casts a message about this command. If there is no prior outstanding simple command that needs to be completed before the current command, it starts executing the newly received simple command. Simple commands may execute in parallel in storage processors 42.

When a storage processor 42 receives an ordered command, it casts a message to announce it and waits for messages from the other storage processors 42 to confirm that all prior commands have completed. The other storage processors 42 do not enable any new simple or ordered command until they receive the message announcing the completion of the previously announced ordered command. Thus, only one ordered command executes at any time.

When a storage processor 42 receives a command with the Head-of-queue attribute, it starts its execution. On receiving the message announcing this command, the other storage processors 42 refrain from enabling any new simple or ordered commands until they are notified by a message that the head-of-queue command completed.

When a storage processor 42 experiences a SCSI command error, it sends the ACA event to the other storage processors 42. Storage processors 42 do not accept new commands (other than ones with the ACA task attribute) into the task queue after receiving the ACA notification. The storage processor 42 that experienced the error condition sends the error response to the initiator 10 and waits for a CLEAR ACA management request from the initiator 10. On received the CLEAR ACA request, the storage processor 42 informs the other processors 42 that the error condition is cleared. The other processors 42 resume their operations.

Two-Layer Target

Figure 5:
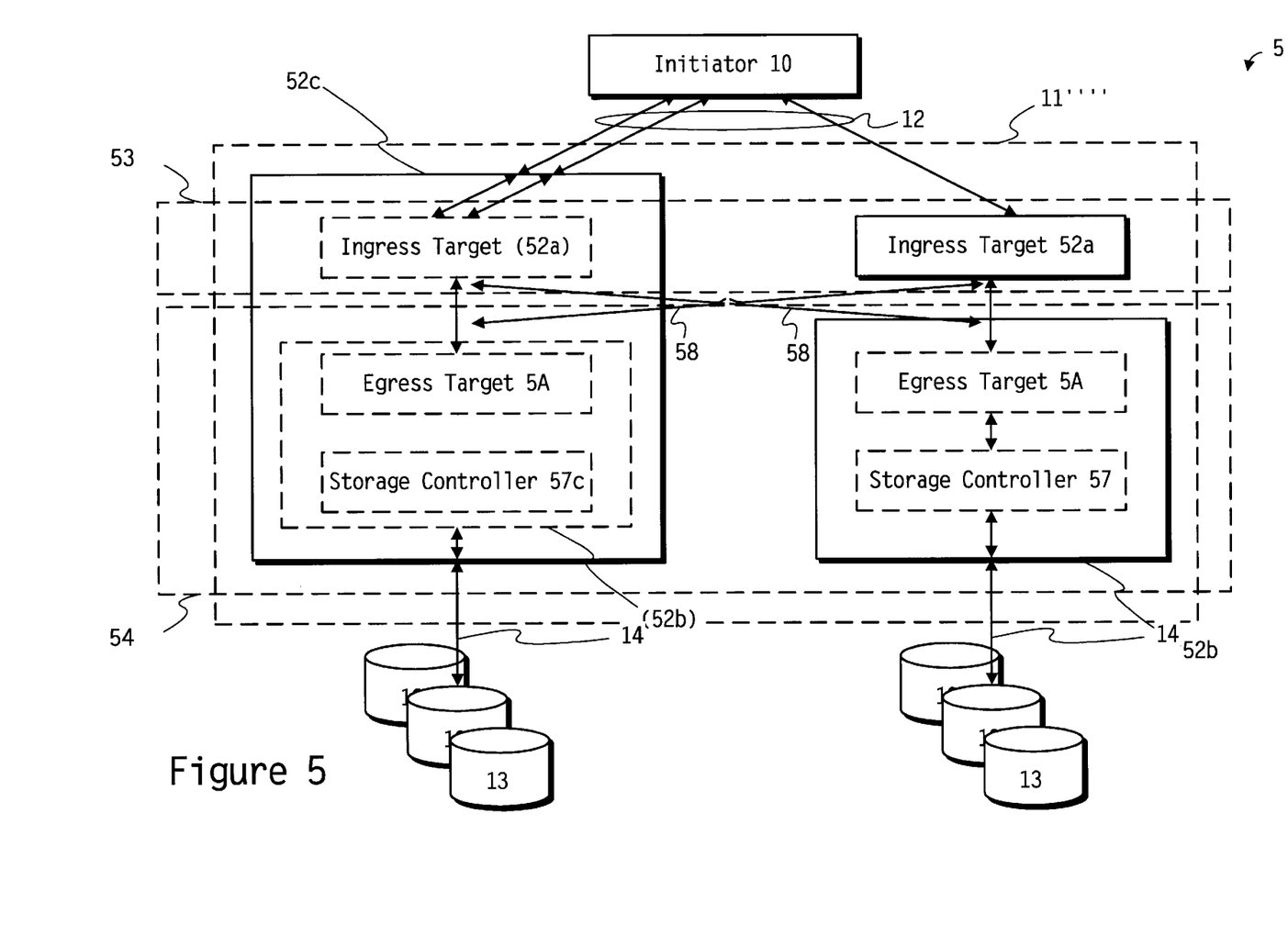
FIG. 5 illustrates the architecture of a computer system incorporating another embodiment of the invention.

FIG. 5 illustrates the architecture of a computer system 5 incorporating another embodiment of the invention. FIG. 5 includes an initiator 10, a distributed target 11'''', one or more storage devices 13 and communications links 12, 14. The links 12 communicatively couple the initiator 10 to the distributed target 11'''', and the link 14 communicatively couples the distributed target 11'''' to the storage devices 13.

The distributed target 11'''' may include two or more storage processors 52 and communications links 58. The links 58 communicatively couple the storage processors 52 to each other 52. The links 58 may be separate physical links or may be part of one or more networks such as a LAN or WAN.

A storage processor 52c may include one or more ingress targets (52a) or one or more egress targets (52b). A storage processor 52c may include a combination of ingress targets (52a) and egress targets (52b). Indeed, a given storage processor 52c may include targets from multiple distributed targets. The set of storage processors for a first distributed target may overlap with the set of storage processors for a second distributed target.

The storage processors 52*a* and their equivalent (52*a*) in the storage processors 52*c* form a front-end target layer 53 (ingress target layer 53). The storage processors 52*b* and their equivalent (52*b*) in the storage processors 52*c*, along with the storage controllers 57, form a back-end target layer 54.

The front-end target layer 53 interacts with iSCSI initiators 10 and with the back-end (egress) target layer 54. The back-end target layer 54 interacts with the storage devices 13.

Each of the storage controllers 57 in the back-end target layer 54 is associated with a given set of blocks of the storage 13. The given sets of blocks do not intersect. The storage controller 57 associated with a given set of blocks is responsible for accessing those blocks.

The ingress target layer 53 implements the iSCSI protocol, the SCSI protocol and a part of the distributed SCSI task management. It also interprets read and write SCSI requests and dispatches them to (the correct corresponding egress target 52*b*, (52*b*) in) the back-end layer 54. (The front-end layer 53 may dispatch to multiple egress targets 52*b*, (52*b*) if the requested blocks spans more than one controller-associated set of blocks.)

Egress target processors 52*b* and their equivalents (52*b*) collectively implement the remaining part of the distributed task queue management. The storage controllers 57 implement other storage functions such as RAID functions to provide virtual disks and data caching.

iSCSI requests use sequence numbering (i.e., CmdSN). A gap in the sequence numbers and the ordered-delivery requirement prevents the processing of new SCSI requests. The sequence numbering is session-wide.

The ingress target storage processor 52*a* or its equivalent module (52*a*) in a storage processors 52*c* tracks iSCSI requests in a request buffer. The request buffer has an entry for each iSCSI request. An Owned Flag field of a request-buffer entry identifies whether this ingress target received the associated SCSI request. For other requests, iSCSI-specific requests received by this ingress target 52*c*, (52*c*) or iSCSI requests received by other ingress target 52*c*, (52*c*), the only information in the request buffer is whether a request was successfully received. This information fills the gaps.

A buffer entry may have the following fields:
  Sequence Number: the sequence number of the request (i.e., CmdSN).
  Hole Flag: a flag indicating whether the iSCSI request is known by this ingress target 52*c*, (52*c*) to have been received by any ingress target.
  Owned Flag: a flag indicating whether this storage processors 52 received the SCSI request.
  Ended Flag: a flag indicating whether a response for the SCSI request is sent to the initiator 10.
  Immediate Flag: a flag indicating whether the SCSI request is for immediate delivery.
  SCSI Request Type Flag: a flag indicating whether the SCSI request is a SCSI command or task management.
  Link Flag: a flag indicating whether the SCSI command is a linked command.
  Task Attribute: a field specifying the attribute of the task for the SCSI command. The values that this field may take are: simple, ordered, head of queue, and ACA.
  Initiator Task Tag: the task tag assigned by the initiator 10.
  Previous Task: a pointer to the request buffer entry that holds the SCSI command of the previous (i.e., the next older) task in the task queue.
  Next Task: a pointer to the request buffer entry holding the SCSI command of the next (i.e., the next younger) task in the task queue.
  Data: a pointer to the data for the SCSI command.
  Module ID List: the list of identifiers uniquely addressing and locating the egress targets 52*b*, (52*b*) to which a part of this request is sent.

At most one session exists between an initiator 10 and a distributed target 11"". The initiator 10 may access multiple logical units of the target 10 within a session. The target 10 maintains a task queue for each session (i.e., for each initiator 10).

The queue table tracks the state of these task queues. A row in the queue table may have the following fields:
  Status: the status of the task queue. The status may be normal or ACA. Normal status indicates any SCSI command is acceptable for the task queue. ACA status indicates an ACA condition is established and only ACA commands are acceptable to the task queue.
  Head: a pointer to the task at the head of the queue. This may be a pointer to a request buffer entry for the task.
  Tail: a pointer to the task at the tail of the queue. This may be a pointer to a request buffer entry for the task.

The task queues may be a linked list of the request-buffer entries, using previous- and next-task pointers. The ingress target 52*a*, (52*a*) implements task management while the egress target 5A, (5A) implements the restricted re-ordering of simple commands (i.e., data integrity). The ingress target 52*a*, (52*a*) implements the logic enabling tasks with ordered, head-of-queue, or ACA attributes. The ingress target 52*a*, (52*a*) is also implements linked commands.

The ingress targets 52*a*, (52*a*) synchronize over an interface to implement distributed task-queue management. The targets 52*a*, (52*a*) may communicate the following messages over the interface:
  Receive-window State: a message communicating the state of the receive-window (i.e., request buffer) of the target. The message may contain the corresponding session ID, a starting sequence number, the receive-window size (in number of requests) and the receive-window state. The receive-window state indicates whether the corresponding request is known to be received or not.
  In one embodiment, the receive window is an array of request states. Each request state is represented by a flag indicating if the corresponding iSCSI request has been received by an ingress target.
  Completion State: a message communicating the state of the receive-window, as above. The Completion State message further including the LUN corresponding to the task queue for this Completion State message. The Completion State message also includes indicators of the completion state for the tasks of the specified queue, and the reception state for the others. In other words, if the buffer entry is for a task of the task queue then the corresponding bit indicates whether the task is completed. Otherwise the bit indicates whether the corresponding iSCSI request is known to be received by the distributed target.
  ACA Condition: a message announcing that the ACA condition is established or cleared for a specified task queue. The message may includes the distributed target ID, the session ID, the logical unit number and the action type, establish or clear.
  ACA Confirmation: a message acknowledging receipt of the ACA condition.

Linked Notification: a message announcing the receipt of a linked command. The message may include the distributed target ID, the session ID, the logical unit number, the sequence number of the first linked command of a chain, and the initiator task tag. The same initiator task tag may be used for all the linked commands of a chain. This tag allows other ingress targets 52a, (52a) to verify the subsequent linked commands when they receive them.

Ordered Notification: a message announcing receipt of command with the ordered task attribute. The Ordered Notification message may include the target ID, session ID, LUN and sequence number.

Head-of-queue Notification: a message announcing receipt of a command with the head-of-queue task attribute. The head-of-queue Notification message may include the target ID, session ID, LUN and sequence number.

ACA Notification: a message announcing receipt of a command with the ACA task attribute. The ACA Notification message may include the target ID, session ID, LUN and sequence number.

iSCSI PDU Notification: a message containing iSCSI PDUs to be forwarded to the other ingress target 52a, (52a). These PDUs include the task management function requests for resetting a target or a logical unit, task-management requests for aborting a task set, and SCSI commands for setting persistent reservations.

Set ExpCmdSN: a message announcing that ExpCmdSN has reached a predetermined value. The Set ExpCmdSN message may include the target ID, session ID and ExpCmdSN.

ExpCmdSN Confirmation: a message confirming receipt of the Set ExpCmdSN message. The ExpCmdSN Confirmation message may include the target ID, session ID and ExpCmdSN.

When an ingress target 52a, (52a) receives an ordered SCSI command, it sends the ordered command notification message to other ingress targets 52a, (52a) using, for example, a multicast message. The other targets 52a, (52a) reply with a Completion State message after processing all the outstanding SCSI commands that are older than the ordered command.

For non-immediate ordered commands, as an ingress target 52a, (52a) receives completion states from the other targets 52a, (52a), it merges these states to find out if all the older requests have completed. If so, it sends a request for the non-immediate ordered command to the corresponding egress SCSI target 52b, (52b). (The target 52a, (52a) may dispatch to multiple egress targets 52b, (52b) if the command needs partitioning.) The enabled and semi-private flags are set for this request. When this command completes, the ingress target 52a, (52a) sends its completion state to the other ingress targets 52a, (52a) to notify them of the completion of the ordered command.

After all the completion states are merged, no completion state (i.e., gaps) is possible for some sequence numbers. If this occurs, the ingress target 52a, (52a) waits for more Completion State messages to fill these gaps. The other targets 52a, (52a) sends more Completion State messages as they receive requests with these missing sequence numbers and complete them.

For immediate ordered commands, the ingress target 52a, (52a) only makes sure that it receives the Completion State messages from other ingress targets 52a, (52a) before sending the immediate ordered command to the corresponding egress target 52b, (52b). (The target 52a, (52a) may dispatch to multiple egress targets 52b, (52b) if the command needs partitioning.) The gaps may be skipped for immediate commands. Instead of semi-private flag, the private flag is set for an immediate ordered command. The immediate flag and enabled flag of the request message are set.

Figure 7:
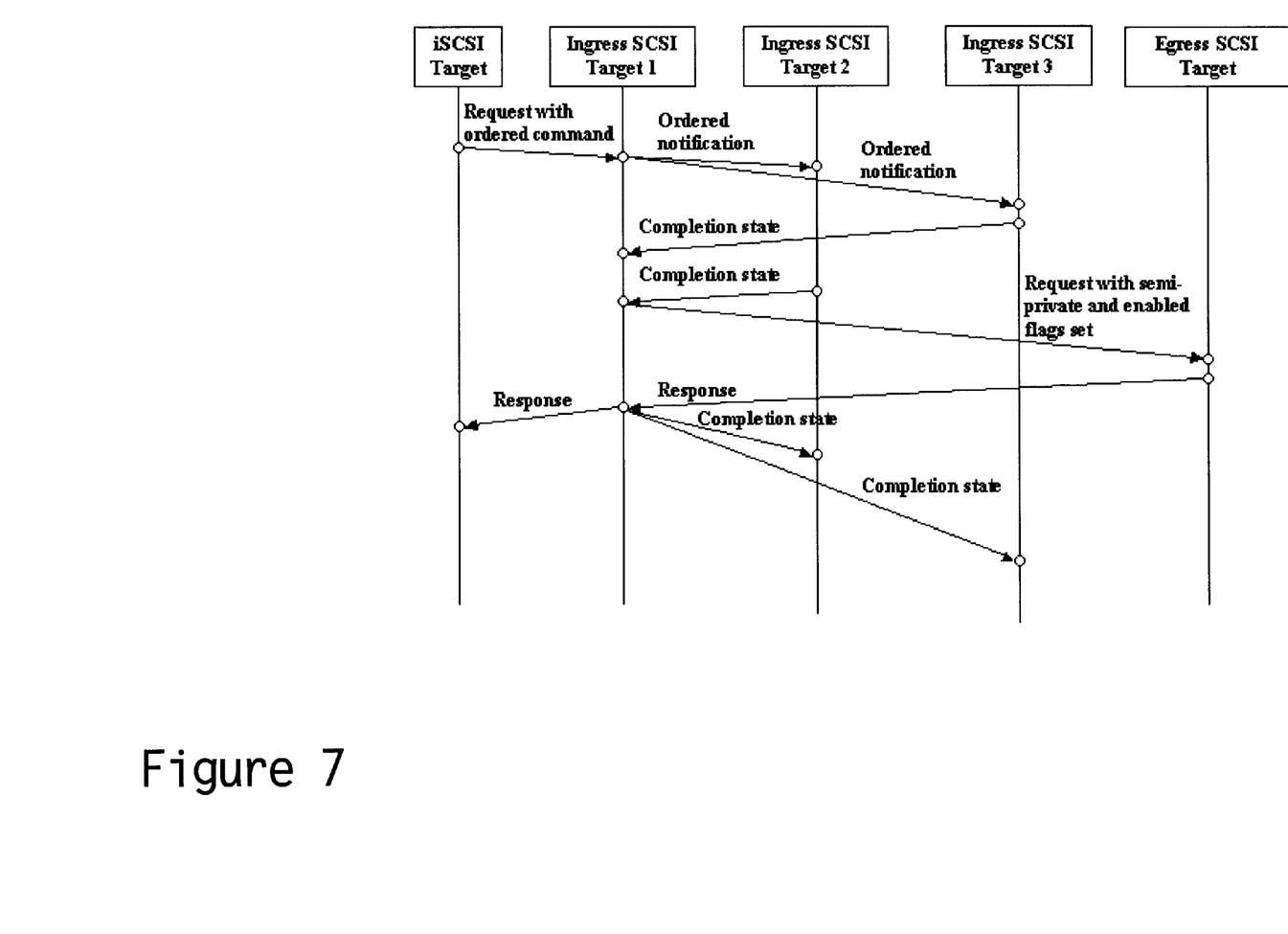
FIG. 7 illustrates the handling of an ordered SCSI command according to one embodiment.

FIG. 7 illustrates the handling of an ordered SCSI command according to one embodiment.

An ingress target 52a, (52a) sends the Head-of-queue Notification message to the other ingress targets 52a, (52a) when it receives a non-immediate head-of-queue SCSI command. The other modules reply with a receive-window state message. When the ingress SCSI module receives the receive-window states of the other modules, it merges these states to determine whether all the older requests have been received. If so, it sends a request for the head-of-queue command to the corresponding egress target 52b, (52b) or targets 52b, (52b), where the command needs partitioning. The enabled and semi-private flags are set for this request. When this command completes, the ingress target 52a, (52a) sends its completion state to the other ingress targets 52a, (52a) to notify them about completion of the head-of-queue command.

After all the receive-window states are merged, gaps for some sequence numbers are possible. If this occurs, the ingress target 52a, (52a) waits for more receive-window state messages to fill these gaps. The other modules send more receive-window state messages as they receive requests with these missing sequence numbers.

For immediate head-of-queue commands, the ingress target 52a, (52a) directly sends a request message to the corresponding egress target 52b, (52b) or targets 52b, (52b), where the command needs partitioning, without sending the notification to the other ingress targets 52a, (52a). Therefore, it does not notify them about head-of-queue command completions either. Instead of semi-private flag, the private flag is set for an immediate head-of-queue command. The immediate flag and enabled flag of the request message are set.

Figure 8:
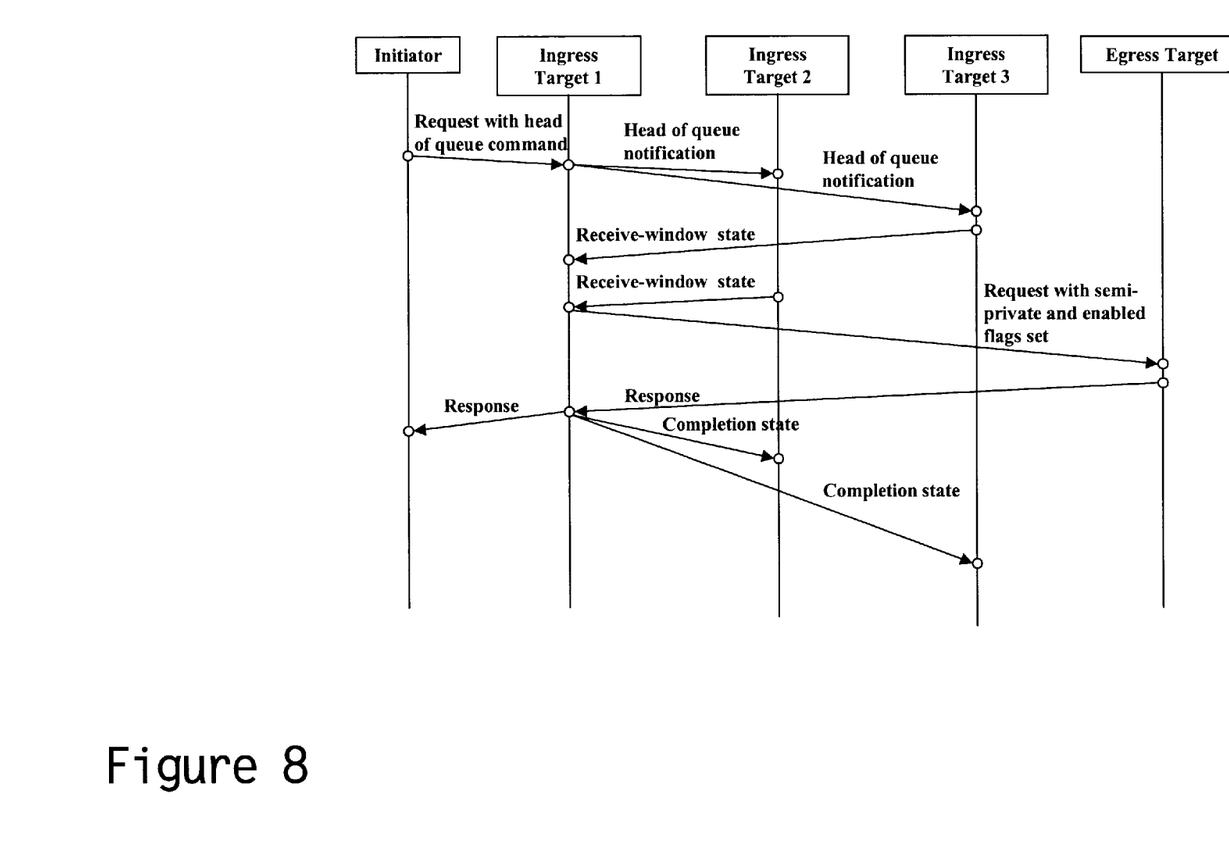
FIG. 8 illustrates the handling of a non-immediate head-of-queue SCSI command according to one embodiment.

FIG. 8 illustrates the handling of a non-immediate head-of-queue SCSI command according to one embodiment.

A system 5 handles ACA and head-of-queue commands similarly, recognizing that only one ACA command may be in the task queue at any time.

An ingress target 52a, (52a) communicates requests for non-immediate simple commands to the corresponding egress target 52b, (52b), where these requests need partitioning.

The ingress target 52a, (52a) may label such a request (i.e., a request for simple command) enabled if all of the following conditions hold: (1) The ingress target 52a, (52a) does not have a hole in its request buffers older than this request; (2) no older ordered or head-of-queue task exists in the task queue for this request; and (3) no older outstanding linked command set (i.e., chain) exists in the task queue.

Requests for immediate simple commands are sent to the corresponding egress SCSI target 52b, (52b) or targets 52b, (52b), if these requests need partitioning, with the immediate and private flags set if the following conditions hold: (1) No older ordered or head-of-queue task is in the task queue for this request; and (2) no older outstanding linked command set (i.e., chain) is in the task queue.

When the ingress target 52a, (52a) receives a response for the completion of a non-immediate simple command (from an egress target module), it fills the gap for any older request by setting the Hole Flag to false for all older requests in its request buffer. Non-immediate simple commands cannot be enabled if there is a hole for an older request in the request buffer of the distributed target.

An ingress target 52a, (52a) sends the linked command notification message to the other ingress targets 52a, (52a) when it receives the first linked SCSI command of a chain. It then processes the command as if it were an unlinked command except that the private flag is set for this command.

When an ingress target 52a, (52a) receives a subsequent linked command of this chain, it sends a request for the linked command to the corresponding egress target or targets 52b, (52b). The enabled and private flags are set for this request. In addition, if this is the last linked non-immediate command of the chain then the semi-private flag is set. Otherwise, the private flag is set for the request.

When the last linked command completes, the ingress target 52a, (52a) sends its completion state to other ingress targets 52a, (52a) to notify them about the completion of the chain of the linked commands.

Figure 9:
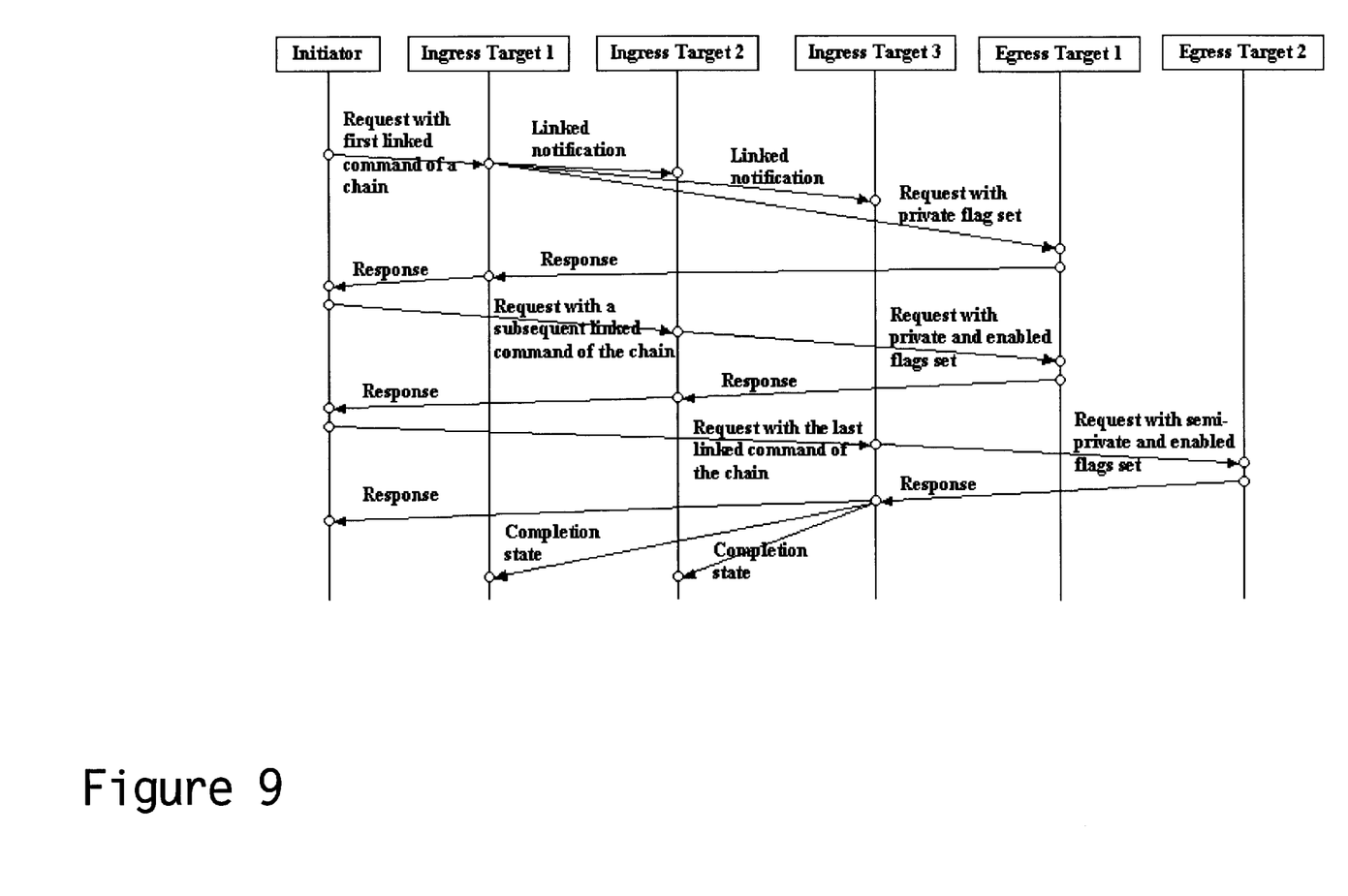
FIG. 9 illustrates the handling of a simple non-immediate linked SCSI command according to one embodiment.

FIG. 9 illustrates the handling of a simple non-immediate linked SCSI command according to one embodiment.

When an error occurs during the processing of a request, the egress SCSI target 52b, (52b) returns a response with error status for that request. On receiving the response, the ingress target 52a, (52a) establishes the ACA condition and sends the ACA Condition message with the establish action to the other ingress and egress targets 52, (52). When the initiator 10 clears the ACA condition, using the Clear ACA task management function, the ingress target 52a, (52a) announce it by multitasking the ACA Condition message with the clear action to the ingress and egress targets 52b, (52b). The recipients acknowledge both establish and clear ACA messages with the ACA Confirmation message. If some of the expected ACA Confirmation messages have not been received within a predetermined time interval, then the ingress target 52a, (52a) retransmits these messages.

A distributed iSCSI implementation ensures that the command window advances correctly. Assuming that N is the maximum command window size that the iSCSI session may accommodate, each ingress target 52a, (52a) may adhere to the following rules:

Set ExpCmdSN in each response to the maximum of (a) the oldest sequence number just before the first gap in the ingress SCSI target request buffer +1 (one) (i.e., the minimum of the sequence numbers of the ingress SCSI target request buffer entries with the Hole Flag equal to true), and (b) the maximum of all ExpCmdSN's received from the other ingress targets 52a, (52a).

If its response would set the ExpCmdSN to any integer multiple of N, then first send a Set ExpCmdSN message to all other ingress targets 52a, (52a) and wait for all of them to acknowledge the message before sending the response to the initiator 10. The message includes the ExpCmdSN that the ingress iSCSI target 52a, (52a) sends to the initiator 10.

The initiator 10 may re-transmit the message if all responses are not received within a given time interval. The confirmation may be, for example, by an ExpCmdSN Confirmation message.

For each message from the target to initiator 10, set MaxCmdSN to ExpCmdSN+N-1.

The interface between the ingress targets 52a, (52a) and the egress targets 52b, (52b) exchanges SCSI requests and responses for read and write commands and exchanges the receive-window state messages. This interface is herein termed, the "inter-target interface." A request message for the inter-target interface may include the following: target ID, session ID, sequence number, enabled flag, semi-private flag, private flag, immediate flag, read-write bit, LUN, starting block number, request size and data for write commands.

The immediate bit indicates whether this request is marked as an immediate request by iSCSI. The read-write bit indicates whether this is a read or a write request. The LUN, starting block number and request size fields specify the logical unit (volume) and its blocks where the read or write operation are to be performed.

If neither the semi-private flag, nor the private flag are set, then the egress target 52b, (52b) may set the bit corresponding to the request in the bit array for receive-window state messages after the egress target 52b, (52b) receives that request.

If the semi-private flag is set, the egress target 52b, (52b) does not communicate the state of this request to the other ingress targets 52a, (52a) until it completes the request. At that point, the request becomes public.

If the private flag is set, the egress target 52b, (52b) does not communicate the state of this request to the other ingress targets 52a, (52a). The ingress target 52a, (52a) changes the privacy attribute of such a request from private to public when a linked command set is completed or when the ingress SCSI target has received all of the responses of a partitioned command. To change the privacy attribute to public, the ingress target 52a, (52a)may, for example, send a receive-window state message in which a state bit corresponding to the request is set.

The private and semi-private flags may not both be set for the same request.

The inter-target interface response message may include the following fields: target ID, session ID, sequence number, status, and data for read commands. The status indicates whether the command successfully completed. In case of failure, it may indicate the type of the error.

For each request within the receive window of the distributed target 10, the egress target 52b, (52b) may maintain the following data:

Sequence Number: the sequence number of the request (i.e., CmdSN).

Sequence Number: the sequence number of the request (i.e., CmdSN).

Hole Flag: a flag indicating whether the request has not been known by this egress target 52b, (52b) (i.e., it has not been received locally, and it has not been announced as known by the other egress targets 52b, (52b)). In one embodiment, if the Hole Flag is set, then the subsequent fields are not meaningful. If the Hole Flag is cleared, then the Owned Flag is set if this egress target 52b, (52b) locally received the request.

Owned Flag: a flag indicating whether this storage processors 52 received the SCSI request. If the Owned Flag is not set, then the subsequent fields are not meaningful. The following have been previously discussed: Ended Flag, Enabled Flag, Immediate Flag, Semi-private Flag, Private Flag, R/W Flag Status, Previous Task, Next Task and Data. The data structure maintained by an egress target 52b, (52b) may be similar to that maintained by ingress targets 52a, (52a).

If an egress target 52b, (52b) cannot process a non-immediate request because of holes, it sends a message with its receive-window state to all the ingress targets 52a, (52a) and waits for them to respond with their receive-window state. As the egress target 52b, (52b) receives the responses, it merges the receive-window information from each ingress target 52a, (52a) to fill its holes. When all the holes are filled, it processes the request.

An ingress target 52a, (52a) does not set the state bit corresponding to a request it sent to an egress target 52b, (52b), in its receive-window state message. This may prevent a set state bit for a request from reaching the egress target 52b, (52b) before the request itself does.

The egress target 52b, (52b) processes a request if the ingress target 52a, (52a) sets the enabled flag for that request. The egress target 52b, (52b) also processes a request if the Hole Flag is cleared for every older request and the semi-private and private flags are cleared for every older owned request.

An egress target 52b, (52b) may start a timer for each receive-window state message it sends for filling a gap. It clears the timer when the replies for the message fill the gap. The egress target 52b, (52b) does not send a new receive-window state message for a request buffer while it is waiting for replies to the previously sent receive-window state message. If the timer runs out, the egress target 52b, (52b) sends a new receive-window state message that reflects the current state of the request buffer. The egress target 52b, (52b) may wait for replies for multiple receive-window state messages as long as there is at most one message sent for each request buffer.

If an egress target 52b, (52b) cannot process an immediate request because of holes, it sends the Assignment Request message to all the ingress targets 52a, (52a). An egress target 52b, (52b) uses the Assignment Request message to determine all the outstanding SCSI commands destined to the egress target 52b, (52b) and older than the immediate request. The egress target 52b, (52b) expects every ingress target 52a, (52a) to send an Assignment Response message. The response message includes all the outstanding SCSI commands that an ingress target 52a, (52a) has already sent or queued to be sent to the egress target 52b, (52b). The egress target considers these SCSI commands to determine if the immediate command should be enabled. The gaps are ignored.

Herein have been taught the distribution of SCSI and iSCSI targets. The described embodiments are by way of example and not limitation. Modifications to the invention as described will be readily apparent to one of ordinary skill in the art.

Provisional Patent Application No. 60/280,588, entitled, "A Virtual Storage Network," naming as inventors David C. Lee et al., filed on Mar. 30, 2001, and under obligation of assignment to Intransa, Inc. of Sunnyvale, Calif. is incorporated herein by reference.

What is claimed is:

1. A method for distributing a SCSI or iSCSI target, the method comprising:
   establishing a session between an initiator and a plurality of storage processors, thereby creating an iSCSI queue and setting a receiving window size; and
   serving initiator requests within the session while
   (a) adhering to SCSI task queue management rules;
   (b) filling in any gaps in the iSCSI queue; and
   (c) handling requests inside and outside the receiving window size.

2. A computer-readable memory containing a computer program for causing a storage processor to assist in distributing a SCSI or SCSI target by
   establishing a connection with an initiator as part of a session between the initiator, the storage processor and at least one other storage processor, thereby creating an iSCSI queue and setting a receiving window size; and
   serving initiator requests within the session while
   (a) adhering to SCSI task queue management rules;
   (b) filling in any gaps in the iSCSI queue; and
   (c) handling requests inside and outside the receiving window size.

3. A storage processor comprising:
   the memory of claim 2; and
   a CPU, coupled to the memory, for executing the program in the memory.

4. A computer system comprising:
   an iSCSI or SCSI initiator;
   a plurality of storage processors of claim 3, coupled to the initiator; and
   a storage device, communicatively coupled to one of the plurality of storage processors.

5. A method for distributing a SCSI or iSCSI target, the method comprising the steps of:
   establishing a session between an initiator and a plurality of target storage processors;
   on the initiator, maintaining information about the state of the session; and
   tracking SCSI commands and responses between the initiator and the plurality of storage processors using the information about the state of the session.

6. The method of claim 5, further comprising the step of on the initiator, ordering the SCSI commands.

7. The method of claim 5, wherein the step of maintaining comprises
   maintaining at least one of the following:
      a queue per logical unit, the queue for SCSI commands waiting to be communicated to the logical unit; and
      a queue per logical unit per connection, the queue for SCSI commands for execution on the logical unit and to be communicated over the connection; and
      a queue per connection, the queue for iSCSI requests to be communicated over the connection.

8. The method of claim 5, wherein the step of maintaining comprises
   maintaining at least two of the following:
      a queue per logical unit, the queue for SCSI commands waiting to be communicated to the logical unit; and
      a queue per logical unit per connection, the queue for SCSI commands for execution on the logical unit and to be communicated over the connection; and
      a queue per connection, the queue for iSCSI requests to be communicated over the connection.

9. A method for distributing a SCSI or iSCSI target, the method comprising the steps of:
   establishing a session between an initiator and a plurality of target storage processors;
   on the initiator, maintaining information about the state of the session; and
   tracking iSCSI requests between the initiator and the plurality of storage processors using the information about the state of the session.

10. A method for distributing a SCSI or iSCSI target, the method comprising the steps of:
    establishing a session between an initiator and a plurality of target storage processors; and
    selecting one of the plurality of target storage processors to oversee request ordering and task queue management.

11. The method of claim 10, further comprising the steps of
    forwarding requests from the plurality of storage processors to the selected target storage processor; and on the selected target storage processor, deciding whether one of the plurality of storage processors is to process the request.

12. The method of claim 10, further comprising the steps of
determining which of the plurality of storage processors is to process the request; and
when that determined storage processor completes the request, directing the initiator and the selected storage processor target to communicate the completion of the request.

13. The method of claim 5, further comprising the step of forwarding block data resulting from the request to the initiator and refraining from forwarding the block data to the selected target storage processor.

14. A method for distributing a SCSI or iSCSI target, the method comprising the steps of:
establishing a session between an initiator and a plurality of target storage processors; and
communicating each request received on one of the plurality of storage processors to all of the other of the plurality of storage processors.

15. The method of claim 14, further comprising the step of
communicating each response from a storage processor to each storage processor that has received a request dependent on the response.

16. The method of claim 14, wherein the step of communicating comprises
multicasting each request received on one of the plurality of storage processors to all of the other of the plurality of storage processors.

17. The method of claim 14, wherein the step of communicating comprises
unicasting each request received on one of the plurality of storage processors to all of the other of the plurality of storage processors.

18. The method of claim 14, further comprising the step of
maintaining a copy of SCSI target queue on each of the plurality of target storage processors.

19. The method of claim 18, further comprising the step of
updating the copy of the target queue based on the communicated request.

20. The method of claim 14, further comprising the step of
determining on each one of the plurality of target storage processors whether a respective request received on each one of the plurality of target storage processors is to execute.

21. The method of claim 20, wherein the step of determining comprises
announcing a received ordered command to the plurality of target storage processors and waiting for confirmations of the announcement from the plurality of target storage processors.

22. A method for distributing a SCSI or iSCSI target, the method comprising the steps of:
establishing a session between an initiator and a plurality of ingress target storage processors;
associating a respective set of blocks of storage with each of a plurality of egress target storage processors; and
associating each of the plurality of egress target storage processors with at least one of the plurality of ingress target storage processors.

23. The method of claim 22, further comprising the step of
implementing the iSCSI protocol in the plurality of ingress target storage processors.

24. The method of claim 22, further comprising the step of
forming a layer including the plurality of ingress target storage processors.

25. The method of claim 24, further comprising the step of
processing
iSCSI and SCSI PDUs or
SCSI task management in the layer of ingress target storage processors.

26. The method of claim 22, further comprising the step of
forming a layer including the plurality of egress target storage processors.

27. The method of claim 26, further comprising the step of
re-ordering simple commands in the layer of egress target storage processors.

28. The method of claim 26, further comprising the step of
implementing SCSI device server functionality in the layer of egress target storage processors.

29. The method of claim 22, further comprising the step of
processing SCSI requests among the plurality of ingress target storage processors, thereby determining which of the plurality of egress target storage processors are destinations for the requests; and
dispatching the SCSI requests to the determined egress target storage processors.

30. The method of claim 22, further comprising the step of
implementing the iSCSI protocol in the plurality of ingress target storage processors.

31. The method of claim 22, further comprising the step of
combining iSCSI and SCSI queue status.

32. The method of claim 31, further comprising the step of
representing combined iSCSI and SCSI queue status in a single data structure.

33. The method of claim 32, further comprising the step of
representing the combined iSCSI and SCSI queue status in a bit array, each bit representing an iSCSI request state.

34. The method of claim 32, further comprising the step of
exchanging the combined queue status in the layer of ingress storage processors.

35. A method for distributing multiple SCSI or iSCSI targets, the method comprising the steps of:
distributing a first SCSI or iSCSI target across a first plurality of target storage processors; and
distributing a second SCSI or iSCSI target across a second plurality of target storage processors,
wherein the first and second pluralities of storage processors overlap.

* * * * *